United States Patent Office 2,982,653
Patented May 2, 1961

2,982,653
ADIPIC ACID COMPOSITION

Harry W. Block, East Orange, N.J., and Paul B. Touher, White Plains, N.Y., assignors to General Foods Corporation, White Plains, N.Y., a corporation of Delaware No Drawing. Filed Sept. 18, 1959, Ser. No. 840,804

15 Claims. (Cl. 99—78)

The following invention relates to an improved method of increasing the solubility rate of adipic acid in water and, in particular, the solubility rate of adipic acid in cold water.

In the past, citric acid has been employed as an acidulant in dehydrated beverage powders capable of being rehydrated in cold water. In addition to citric acid, such powders usually contain other hydroscopic materials such as sugars and the like. Such compositions are relatively unstable if stored for extended periods of time since they readily absorb moisture and cake upon standing. The storage problem encountered with such dehydrated beverage powders has always been of great concern to those skilled-in-the-art and in particular the storage problems encountered in warm, humid climates. Adipic acid has many properties which make it desirable for commercial use in such products. However, such uses are limited due to the fact that adipic acid has a very low rate of solubility in cold water. While the dry beverage powders of commerce are rehydratable in cold water in less than one minute, the use of adipic acid in such powders in the past has been impossible due to the fact that the adipic acid does not dissolve rapidly in cold water, periods as long as 24 hours at times not being sufficient to put all of the adipic acid into solution.

It is an object of this invention to prepare an adipic acid composition which has an increased rate of solubility in cold water. It is a further object of this invention to prepare an adipic acid composition which when used in cold water soluble beverage powders will not absorb substantial amounts of moisture upon standing and will be readily and easily soluble in cold water. Further objects of this invention will be apparent from a reading of the specification.

It has now been discovered that the rate of solubility of adipic acid may be increased by mixing adipic acid with a chloride salt selected from the group consisting of sodium chloride and ammonium chloride in the presence of moisture and drying the mixture.

The term "salt" as used hereinafter refers to the chloride salts selected from the group consisting of sodium chloride and ammonium chloride.

While it is preferred to use water as the moisture source, other solvents in which both the adipic acid and the chloride salt are soluble may be employed.

In producing the adipic acid composition of this invention, the adipic acid is preferably ground to effect size reduction, typically particle sizes of commercial 70 to 230 U.S. standard mesh are desirable and preferably a particle size of commercial 100 U.S. standard mesh. The ground adipic acid may then be mixed with a salt having a mesh size of commercial 30–100 U.S. standard mesh and preferably commercial 40 to 50 U.S. standard mesh. For each part by weight of adipic acid, 0.05 to 1.0 or more parts by weight of salt may be employed and preferably 0.1 part by weight. While more than one part by weight of salt per part by weight of adipic acid may be employed, at the higher levels the result, in view of the level of adipic acid employed in most products, is a product which is too salty. The adipic acid and salt are mixed to obtain a homogeneous mixture. The mixture is then moistened by the addition of at least 5% water by weight of the total solids. While less than 5% moisture will not sufficiently wet the dry ingredients, the maximum moisture content is not critical so long as the entire mass is not dissolved. When both the salt and adipic acid are dissolved and then evaporated to dryness, the rate of solubility of the adipic acid is not increased. Hence, the mixture of adipic acid and salt is moistened under conditions where at least a portion of either of the ingredients retains its dry state and aggregates of the ingredients are formed upon drying the moistened mixture.

According to another embodiment of this invention, the moistened material is well mixed to uniformly distribute the water and is then granulated by forcing it through a commercial 10 to 40 U.S. standard mesh screen and preferably a 30 U.S. standard mesh screen. The ground, wet material is then dried at a temperature below which decomposition or melting of the adipic acid takes place.

According to a further embodiment of this invention, the wetted material is well mixed to uniformly distribute the water and is then dried at a temperature below which decomposition or melting of the adipic acid takes place. Drying is continued until the final moisture content is less than 1% and preferably less than 0.5%. Moisture contents over 1% result in a final product which cakes upon storage. The dried material is then granulated by screening through a 16 to 40 and preferably a 30 U.S. standard mesh screen.

As an alternative to the preceding embodiments, when it is desired to employ the composition of the present invention in admixture with other pulverulent materials, such materials may be added to the moistened mixture of any of the preceding embodiments before drying and the entire mass dried while being mixed and agitated. Where sucrose is the major constituent of the added pulverulent material, eminently desirable results are obtained if the moistened mass is dried with infra-red heat since the temperature of the sucrose can readily be maintained below 90° F. thus preventing the undesirable inversion of sucrose. The advantage of such a procedure is that it allows simultaneous agglomeration of adipic acid powder and salt with the sugar ingredients of the composition as well as blending of such agglomerates with the remaining ingredients of such a composition.

As yet a further alternative to the preceding embodiments, the dried pulverulent materials of the present invention may be combined by agglomerating in any conventional steam agglomeration process. The agglomerated material is then granulated by screening through a 16 to 40 and preferably a 30 U.S. standard mesh screen.

The following examples illustrate several embodiments of the present invention but it is to be understood that these examples are for purposes of illustration only and that the invention is not limited thereto since various changes can be made by those skilled-in-the-art without departing from its scope and spirit.

Example 1

Four hundred pounds of 100 mesh adipic acid are blended with 100 pounds of sodium chloride having a particle size of 50 U.S. standard mesh. The dry ingredients are blended in a ribbon mixer for ten minutes. Thirty-five pounds of water are added to the blended mixture and the mixing is continued for an additional ten minutes to insure uniform distribution of the moisture. The wetted mixture is then dried to a moisture content of 0.5% by introducing steam at a pressure of 7–10 p.s.i.g. into the jacket of the mixer and agitating for 25 minutes at low speed and 15 minutes at high speed. The dried material is then screened to obtain a particle size of 30 U.S. standard mesh.

*Example 2*

Four hundred pounds of 100 mesh adipic acid are blended with 100 pounds of sodium chloride having a particle size of 50 U.S. standard mesh. The dry ingredients are blended in a ribbon mixer for ten minutes. Thirty-five pounds of water are added to the blended mixture and the mixing is continued for an additional ten minutes to insure uniform distribution of the moisture. The wetted mixture is then screened to obtain particles having a size of 30 U.S. standard mesh. The screened particles are then dried without agitation in a Proctor and Schwartz drier to obtain a final moisture content of 0.5%.

The adipic acid composition of the present invention may be employed wherever it is desired to utilize adipic acid in cold water where a relatively rapid rate of solubility is required. One such use is in fruit flavored beverage mixes which are dissolved in very cold water. Such mixes typically contain sugars, an edible acid, flavoring and coloring. A typical fruit flavored beverage mix composition as employed in this invention is:

| | |
|---|---|
| Adipic acid | 20.00–60.00 parts by weight. |
| Fruit flavor (natural or imitation, fixed in gum arabic) | .25–1.75 parts by weight. |
| Color (FD&C, certified food coloring) | .10–1.25 parts by weight. |
| Dextrose hydrate or sucrose | Sufficient to bring the total parts by weight to 100. |

17.7 grams of the above mix may be dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage powders which contain the adipic acid composition of the present invention in combination with a hydroscopic sugar such as sucrose or the like exhibit little or no caking after extended periods of storage, and after such time, can be rehydrated in cold water within several minutes.

What is claimed is:

1. A method of preparing an adipic acid containing composition having an increased rate of solubility which comprises mixing a chloride salt selected from the group consisting of sodium chloride and ammonium chloride with adipic acid powder in the presence of moisture under conditions where the chloride salt is not completely dissolved, and drying said mixture.

2. A method of preparing an adipic acid containing composition having an increased rate of solubility which comprises mixing a chloride salt selected from the group consisting of sodium chloride and ammonium chloride with adipic acid powder, adding moisture to said mixture, mixing the moisture into said mixture under conditions where the chloride salt is not completely dissolved, and drying said moistened mixture.

3. A method of preparing an adipic acid containing composition having an increased rate of solubility which comprises mixing 0.05–1.0 part by weight of sodium chloride with one part by weight of adipic acid, adding 5–10% water to said mixture, mixing the water into said mixture under conditions where the sodium chloride is not completely dissolved, and drying said moistened mixture.

4. The method according to claim 3 wherein the moistened mixture is granulated through a 10 to 40 U.S. standard mesh screen prior to drying.

5. The method according to claim 3 wherein the moistened mixture is granulated through a 30 U.S. standard mesh screen prior to drying.

6. The method according to claim 3 wherein the dried adipic acid composition is granulated through a 16–40 U.S. standard mesh screen.

7. The method according to claim 3 wherein the dried adipic acid composition is granulated through a 30 U.S. standard mesh screen.

8. A method of preparing an adipic acid containing composition having an increased rate of solubility which comprises mixing 0.05–1.0 part by weight of a chloride salt selected from the group consisting of sodium chloride and ammonium chloride and agglomerating such mixture under conditions where the chloride salt is not completely dissolved.

9. An adipic acid containing composition having an increased rate of solubility in cold water which comprises aggregates of an adipic acid powder in combination with a chloride salt selected from the group consisting of sodium chloride and ammonium chloride.

10. An adipic acid containing composition having an increased rate of solubility in cold water which comprises aggregates of one part by weight of adipic acid powder and 0.05–1.0 part by weight of sodium chloride.

11. The adipic acid composition of claim 10 wherein the adipic acid has a particle size of commercial 70 to 230 U.S. standard mesh and the sodium chloride a particle size of commercial 30 to 100 U.S. standard mesh.

12. The adipic acid composition of claim 10 wherein the adipic acid has a particle size of commercial 100 U.S. standard mesh and the sodium chloride has a particle size of commercial 50 U.S. standard mesh.

13. The adipic acid composition of claim 10 wherein the dry aggregates have a particle size of commercial 16 to 40 U.S. standard mesh.

14. The adipic acid composition of claim 10 wherein the dry aggregates have a particle size of commercial 30 U.S. standard mesh.

15. A cold water soluble, fruit flavored beverage mix which comprises 20.00–60.00 parts by weight of an adipic acid containing composition having an increased rate of solubility prepared by mixing a chloride salt selected from the group consisting of sodium chloride and ammonium chloride with adipic acid powder in the presence of moisture under conditions where the chloride salt is not completely dissolved and the mixture then dried, 0.25–1.75 parts by weight of fixed fruit flavor, 0.10–1.25 parts by weight of color and sufficient dextrose hydrate to bring the total parts by weight to 100.

References Cited in the file of this patent

UNITED STATES PATENTS

| | | |
|---|---|---|
| 2,436,086 | Baier | Feb. 17, 1948 |
| 2,463,962 | Gorcica | Mar. 8, 1949 |

FOREIGN PATENTS

| | | |
|---|---|---|
| 550,539 | Great Britain | Jan. 13, 1943 |
| 552,811 | Great Britain | Apr. 27, 1943 |